(12) United States Patent
Prelec, Sr.

(10) Patent No.: US 7,583,051 B2
(45) Date of Patent: Sep. 1, 2009

(54) BATTERY CHARGER CASING

(76) Inventor: Michael L. Prelec, Sr., 4175 Hwy. 11, Deland, FL (US) 32724

( * ) Notice: Subject to any disclaimer, the term of this patent is extended or adjusted under 35 U.S.C. 154(b) by 306 days.

(21) Appl. No.: 11/089,483

(22) Filed: Mar. 24, 2005

(65) Prior Publication Data

US 2006/0214635 A1 Sep. 28, 2006

(51) Int. Cl.
  *H02J 7/00* (2006.01)
  *H01M 2/00* (2006.01)
(52) U.S. Cl. ............................ 320/104; 429/163
(58) Field of Classification Search ............ 320/104; 307/10.1, 10.7; 703/8; 429/153, 163; D13/107, D13/108, 109, 110; 903/903, 952
  See application file for complete search history.

(56) References Cited

U.S. PATENT DOCUMENTS

| D170,762 | S | * | 11/1953 | Medlar et al. ............... D13/107 |
|---|---|---|---|---|
| 3,726,717 | A | * | 4/1973 | Zaleski ........................ 429/162 |
| 5,272,459 | A | * | 12/1993 | Geery .......................... 336/61 |
| 5,488,283 | A | * | 1/1996 | Dougherty et al. ......... 307/10.1 |
| 5,510,658 | A | * | 4/1996 | Nakayama ................. 307/10.1 |
| 6,037,749 | A | * | 3/2000 | Parsonage .................. 320/132 |
| 6,039,137 | A | * | 3/2000 | Schless ....................... 180/220 |
| 6,239,508 | B1 | * | 5/2001 | Faris et al. .................. 307/9.1 |
| 6,326,704 | B1 | * | 12/2001 | Breed et al. ................. 307/9.1 |
| 6,380,712 | B2 | * | 4/2002 | Murphy et al. ............. 320/107 |
| 6,426,606 | B1 | * | 7/2002 | Purkey ........................ 320/103 |
| 6,724,589 | B1 | * | 4/2004 | Funderburk .................. 361/42 |
| 6,758,291 | B1 | * | 7/2004 | Koch ........................... 180/11 |
| 7,239,225 | B2 | * | 7/2007 | Tirmizi ........................ 337/30 |
| 2004/0169489 | A1 | * | 9/2004 | Hobbs ......................... 320/104 |
| 2005/0243655 | A1 | * | 11/2005 | McCutcheon et al. ....... 368/107 |

* cited by examiner

*Primary Examiner*—Edward Tso
*Assistant Examiner*—M'Baye Diao
(74) *Attorney, Agent, or Firm*—McKinney Law, PLLC

(57) ABSTRACT

A battery charger casing for providing increased protection from impact, corrosion and moisture intrusion. The present invention includes a rigid shell in the shape of a vehicle that is secured to a bottom plate forming a protective void to house the electrical circuitry. A plurality of struts is interposed between the bottom plate and the electrical circuitry so that any impact force sustained by the casing is isolated to the struts. An epoxy material encapsulates the electrical circuitry within the protective void providing increased impact protection, heat dissipation and weather proofing characteristics.

20 Claims, 3 Drawing Sheets

BATTERY CHARGER CASING

BACKGROUND OF THE INVENTION

1. Field of the Invention

The present invention relates generally to battery chargers, and more specifically to a battery charger with an improved casing for protecting its electronic circuitry.

2. Description of the Prior Art

To charge a battery, the battery charger is placed within a few feet of the battery and one connection is made to the battery and a second connection is made to an alternating current (AC) power source. The battery charger is left connected for several hours to several weeks or months depending on the application. If the battery charger is left unattended for a significant amount of time, it is imperative the battery charger be protected from being damaged from impacts, corrosion and moisture intrusion. A damaged battery charger may result in a fire or cause substantial damages from its malfunction. There is a need for a battery charger that can be left unattended for long periods of time without fear that the battery charger will be damaged.

Many battery chargers exist with a thin metal casing containing the electrical circuitry. Should these types of battery chargers accidentally be dropped or otherwise sustain impact, the likelihood of damage to the internal circuitry is great. Other prior art battery chargers are encased in plastic and the electrical circuitry similarly can be damaged by an impact. There is a need for a battery charger casing that has improved impact protection characteristics.

Typically, when the battery charger is used to replenish a vehicle battery, the charger is placed on a dry and level surface. Often times the surface is pavement. However for the scenario of a battery charger used to charge a watercraft battery, there is the possibility of moisture coming into contact with the battery charger. This can lead to disastrous results as the battery of a watercraft may operate the bilge pump and if the battery goes dead and the electric bilge pump does not operate, this may lead to the watercraft sinking. Accordingly, it is imperative that the battery charger is not susceptible to corrosion and moisture intrusion so that a battery remains charged to protect from property loss. There is a need to provide a battery charger that is waterproof and able to withstand a hostile environment.

Batteries are available in different voltages depending on the purpose of the battery and requirements of the vehicle or watercraft. Accordingly, battery chargers are available in different power input and output. In many countries, the AC voltage is 110 V, however in some countries the AC voltage is higher and have different power source connections. This results in a different battery charger being required for each different power source. The electrical connections are permanently hard wired into the internal circuitry of the battery charger. It is difficult to determine quickly whether a battery charger is wired for 110 V or some other voltage, as battery charger casings are often indistinguishable. A battery charger casing that quickly identifies the battery charger's power source requirements and output is needed.

Accordingly, what is needed in the art is a battery charger casing with increased protection of the electrical circuitry and unique identification characteristics that overcomes the limitations of prior art battery charger casings and provides an improvement that is a significant contribution to the advancement of the battery charger casing art.

However, in view of the prior art at the time the present invention was made, it was not obvious to those of ordinary skill in the pertinent art how the identified needs could be fulfilled.

SUMMARY OF THE INVENTION

The invention provides for an improved battery charger casing that provides additional protection to the internal electrical circuitry. One embodiment of the invention comprises an independent power source capable of supplying a steady state electrical current and electrical circuitry for transforming the steady state electrical current to a predetermined electrical current to charge a battery. A power wire is in electrical communication with the power source and the electrical circuitry and a battery wire is in electrical communication with the electrical circuitry and a battery. A rigid shell is irremovably secured to a bottom plate forming a protective void to house the electrical circuitry. In the preferred embodiment, the rigid shell is in the pre-determined shape of a vehicle such as a NASCAR®. A plurality of struts is interposed between the bottom plate and the electrical circuitry so that any impact force sustained by the casing is isolated to the struts. The struts may be comprised of a resilient material. An epoxy material is used to encapsulate the electrical circuitry within the protective void. The battery to be charged has an auxiliary connect plug so that the battery can be quickly disconnected from the battery charger casing. In addition, a front terminal is in electrical communication with the electrical circuitry and it is receptive to the battery wire. The battery wire has a quick connect plug to attach to the battery and a second quick connect plug for attaching to the front terminal. Similarly, a rear terminal is in electrical communication with the electrical circuitry and receptive to the power wire. The power wire has a quick connect plug to attach to the rear terminal. When the power wire and battery wire are removed from the battery charger casing, the casing can be displayed as a model.

In another embodiment of the invention, the electrical circuitry further comprises a headlight indicator LED mounted in a simulated headlight of the shell so that the mode of operation of the battery charger circuitry can be determined. The electrical circuitry also comprises a windshield indicator LED mounted in a simulated windshield of the shell so that a first function of an operation of the electrical circuitry can be monitored. A taillight indicator LED is mounted in a simulated taillight of the shell so that a second function of an operation of the electrical circuitry can be monitored.

In another embodiment of the invention, the bottom plate further comprises a plurality of wheels equally disposed about the perimeter of the bottom plate similar to a NASCAR® vehicle so that the battery charger casing is elevated from the floor.

A primary object of the invention is to provide an apparatus that improves the protection of battery charger circuitry from impacts such as being dropped.

Another very important object of the invention is to provide an apparatus that improves the protection of battery charger circuitry from accidental grounding.

Another important object of the invention is to provide a means to determine the current mode of operation and status of the battery charging process.

Still another very important object of the invention is to provide an apparatus that improves the protection of battery charger circuitry from corrosion and moisture intrusion.

Another very important object of the invention is to provide a battery charger casing that provides a means to quickly identify the battery charger and its characteristics to avoid unintentional misuse.

These and other important objects, advantages, and features of the invention will become clear as this description proceeds.

The invention accordingly comprises the features of construction, combination of elements, and arrangement of parts that will be exemplified in the description set forth hereinafter and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

Figure 1:
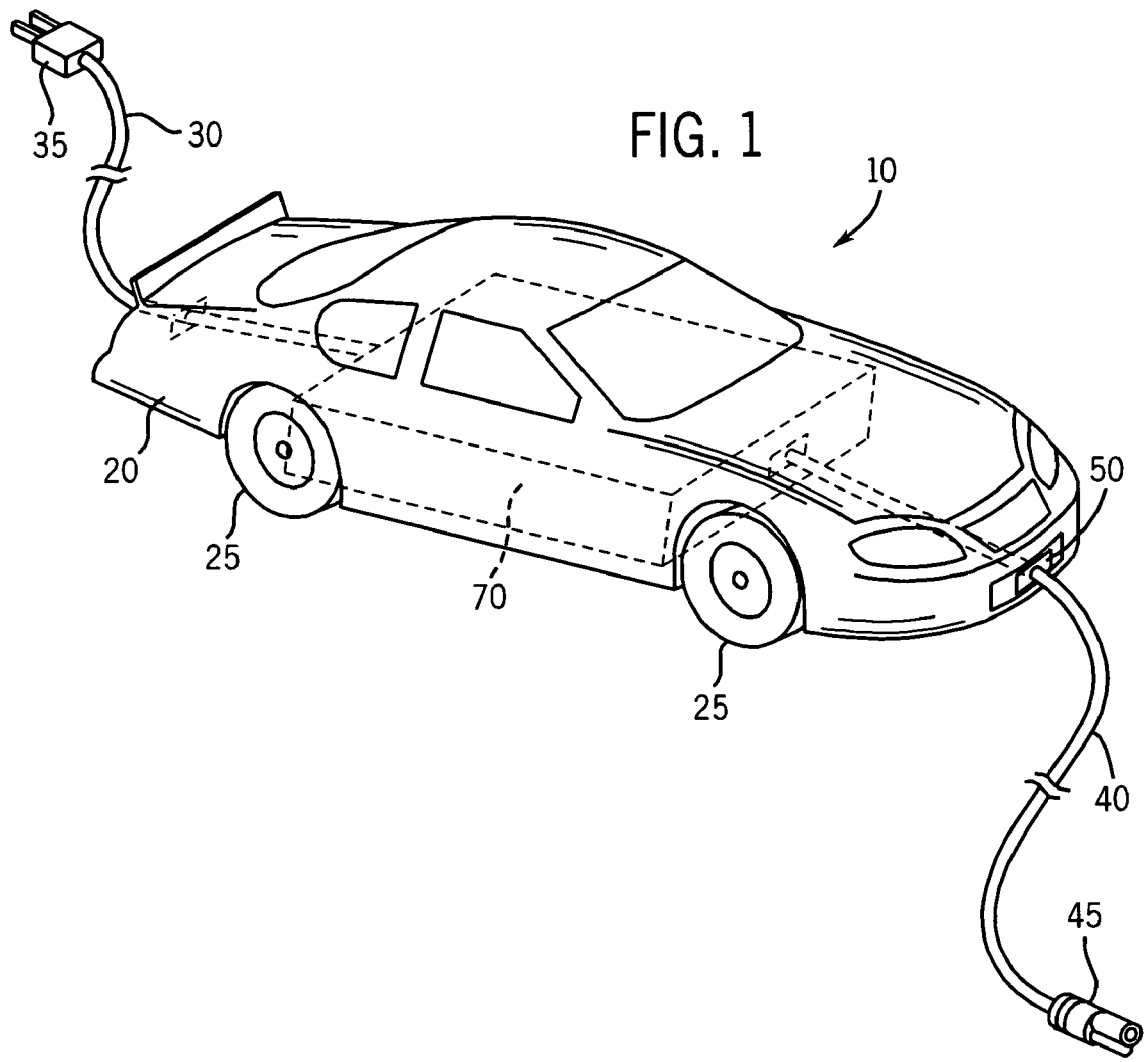
FIG. 1 is a frontal perspective view of a battery charger casing that shows the quick connector and battery wire in accordance with the present invention.

FIG. 1 shows one embodiment of a battery charger casing generally denoted 10. In the preferred embodiment the shell 20 protects battery charger circuitry 70 from impacts from being dropped. Wheels 25 form an insulator to protect circuitry 70 from accidental grounding. Additionally, wheels 25 elevate casing 10 from the floor surface where water or other conductive liquids may be present and allow casing 10 to be moved easily without sliding directly on the floor. Power source wire 30 and power plug 35 are in electrical communication with a power source (not shown) and battery charger circuitry 70 contained within shell 20. The power source provides the current to activate the battery charger circuitry 70 that ultimately provides the proper current to charge a lead acid battery (not shown). Battery charger circuitry 70 is capable of handling input power of alternating current voltage of between 90 and 240 volts at 50 or 60 hertz. Battery wire 40 and quick connect plug 45 are in electrical communication with a lead acid battery in the preferred embodiment. The first end of battery wire 40 is in electrical communication with circuitry 70 via front terminal 50.

Figure 2:
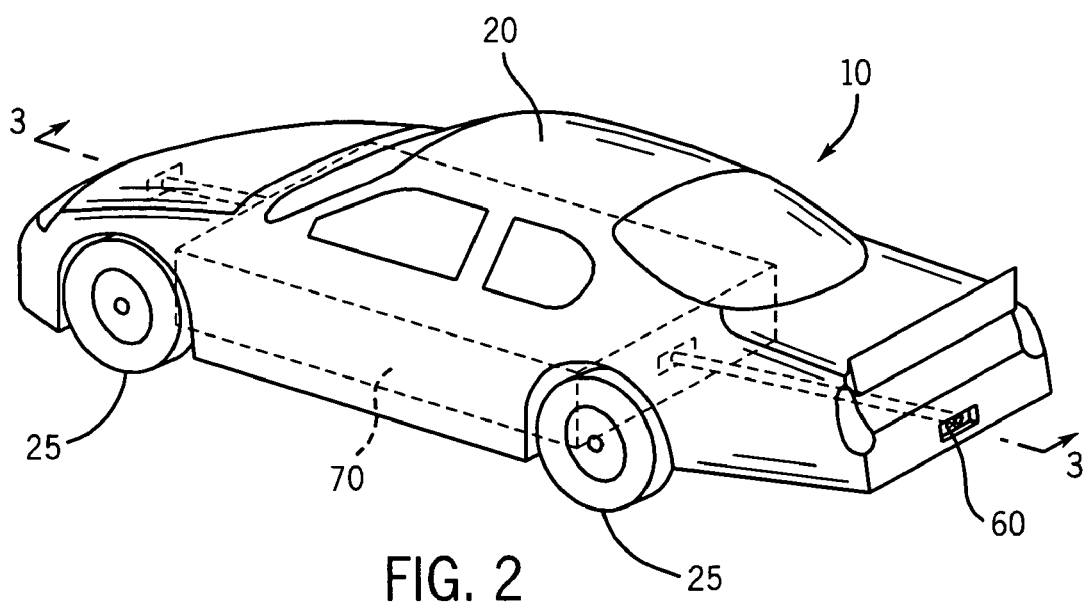
FIG. 2 is a rear perspective view of a battery charger casing that shows the rear terminal with power plug and wire removed in accordance with the present invention.

FIG. 2 is a rear perspective view of battery charger casing 10 that shows rear terminal 60 with power wire 30 and plug 35 removed. Battery wire 40 and quick connect plug 45 are also removed from casing 10 to illustrate that in the preferred embodiment the casing 10 provides a unique casing configuration that replicates a NASCAR® vehicle. In addition to providing increased protection to the battery charger circuitry 70, the unique casing configuration 20 allows an individual to quickly identify a battery charger and its intended use.

Figure 3:
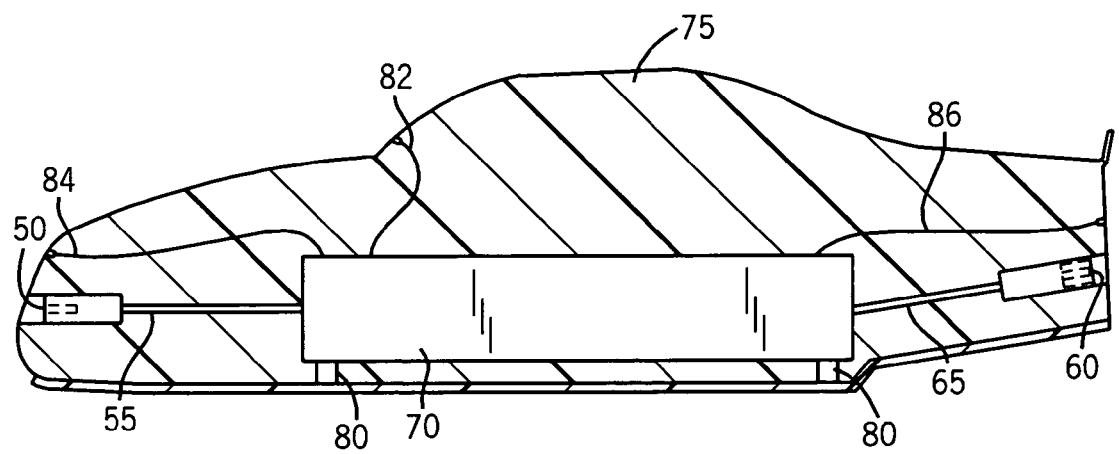
FIG. 3 is a cross sectional side view in accordance with the present invention.
Figure 4:
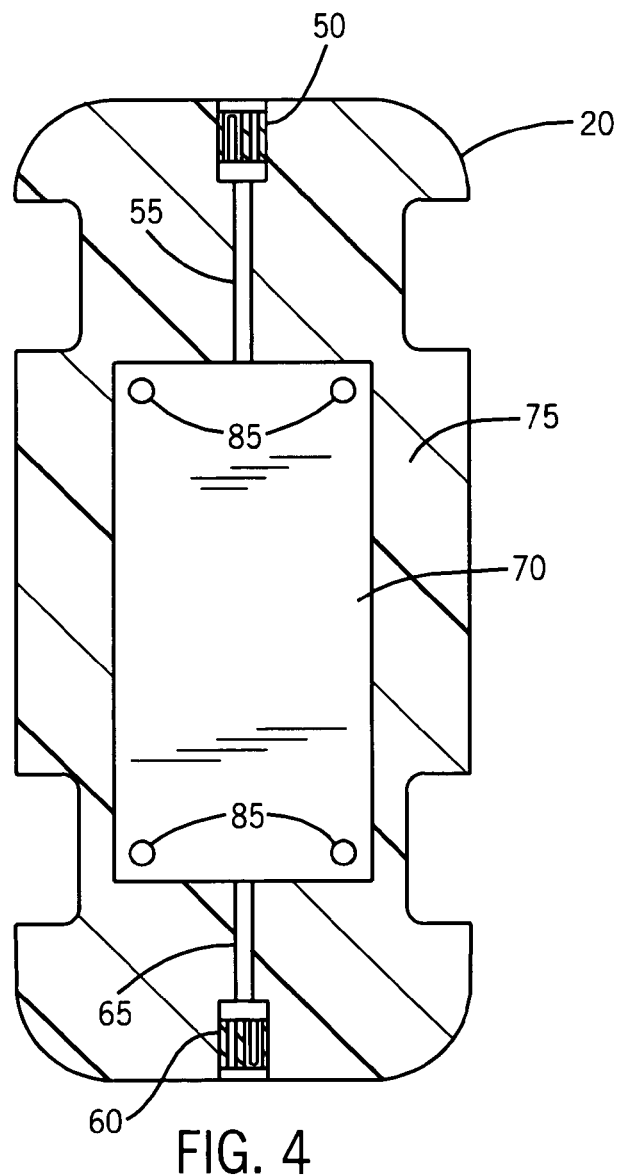
FIG. 4 is a bottom view of the lower plate without the wheels, shown separately for clarity of illustration in accordance with the present invention.

FIG. 3 shows a cross sectional view of the preferred embodiment of the battery charger casing 10. Front circuitry wire 55 is an electrical communication with front terminal 50. Front terminal 50 is receptive to a quick connector well known in the industry so that battery wire 40 and plug 45 can be easily attached and removed from casing 10. Similarly, rear terminal 60 is receptive to a quick connector so that power wire 30 and plug 235 can also be easily attached and removed from casing 10. Rear circuitry wire 65 is in electrical communication with rear terminal 60. To quickly determine the mode of operation of battery charger circuitry 70, headlight indicator LED 84 is mounted in the headlight portion of the shell 20 as shown in FIG. 3. Both windshield indicator LED 82 that is mounted at the top portion of the windshield portion of shell 20 and taillight indicator LED 86 that is mounted in the taillight portion of shell 20 are used to show additional pre-determined functions of the current operation of circuitry 70. Epoxy 75 encapsulates the circuitry 70 providing complete protection from impact, moisture intrusion and corrosion. Referring to FIG. 3 and FIG. 4, four circular male struts (80) are provided proximate the respective four corners of battery charger circuitry 70. Struts (80) elevate circuitry 70 from bottom portion of casing 10 to allow a layer of epoxy 75 to form a protective barrier interposed between circuitry 70 and casing 10. Epoxy 75 also provides an effective means to dissipate heat generated by circuitry 70.

Referring to FIG. 4, the location and spacing of circular female receptacles 85 located on circuitry 70 for receiving male struts 80 is shown. As discussed above, front terminal 50 and rear terminal 60 are in electrical communication with circuitry 70 via front wire 55 and rear wire 65, respectively. Still referring to FIG. 4, epoxy 75 is shown encapsulating the entire perimeter of circuitry 70. In the preferred embodiment, battery charger circuitry 70 comprises mounted circuit board components.

Figure 5:
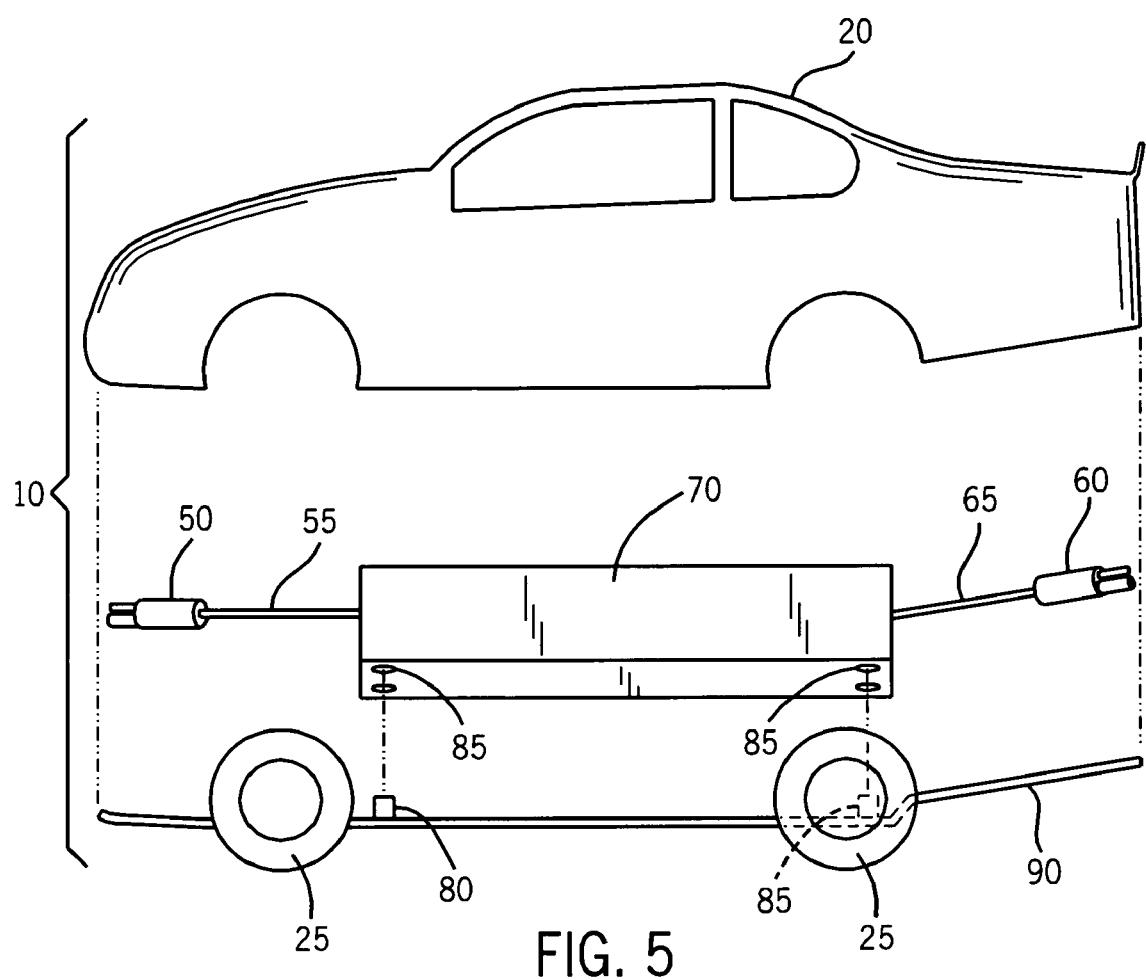
FIG. 5 is an exploded view in accordance with the present invention.

FIG. 5 in the preferred embodiment shows an exploded view of the battery charger casing and internals without epoxy 75 for clarity. Female receptacles 85 are shown dispersed on the bottom portion of circuitry 70 to provide balanced support for the maximum protection from dynamic impact. Receptacles 85 are strategically located at non-critical areas of circuitry 70 so that in the event of impact the force is not absorbed by the mounted components on the circuit board that comprise battery charger circuitry 70. Also shown in FIG. 5 is bottom plate 90. Bottom plate 90 forms the platform for wheels 25 and male struts 80 to be mounted. In the preferred embodiment, the bottom plate 90 is irremovably attached to shell 20 and encapsulating circuitry 70.

In an alternative embodiment, shell 20 is removable and a different pre-determined shaped shell (not shown) such as a BMW®, Mini Cooper® or Porsche® shaped rigid shell can replace the original shell 20. Shell 20 is slid into place and secured to bottom plate 90 with appropriate biasing means well known in the art to cover circuitry 70. In another alternative embodiment, an audio computer chip (not shown) is mounted within shell 20 and produces sounds that simulate a vehicle engine.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown. It is therefore evident that the particular embodiments disclosed above may be altered or modified and all such variations are considered within the scope and spirit of the invention.

It is also to be understood that the following claims are intended to cover all of the generic and specific features of the invention herein described, and all statements of the scope of the invention, which as a matter of language, might be said to fall therebetween.

Now that the invention has been described.

What is claimed is:

1. A battery charger casing comprising:
   electrical circuitry for transforming an external steady state alternating current (AC) electrical current from an independent power source to a predetermined electrical current to charge a battery;
   a power wire in electrical communication with the power source and the electrical circuitry;
   a battery wire in electrical communication with the electrical circuitry and the battery, wherein the battery is outside of the battery charger casing;
   a rigid shell in a shape of a vehicle and irremovably secured to a bottom plate forming a protective void to house the electrical circuitry, wherein the external steady state AC electrical current is supplied from outside and independent of the shell;
   a plurality of struts contained within the interior of the rigid shell and interposed between the bottom plate and the electrical circuitry so that any impact force sustained by the casing is isolated to the struts; and
   an epoxy material encapsulating the electrical circuitry within the protective void.

2. The battery charger casing of claim 1 wherein the electrical circuitry further comprises a headlight indicator LED, which is visible outside the shell when the electrical circuitry is in use, mounted in a simulated headlight of the shell so that a mode of operation of the electrical circuitry can be determined.

3. The battery charger casing of claim 2, wherein the electrical circuitry further comprises a windshield indicator LED mounted in a simulated windshield of the shell so that a first function of an operation of the electrical circuitry can be monitored.

4. The battery charger casing of claim 3, wherein the electrical circuitry further comprises a taillight indicator LED mounted in a simulated taillight of the shell so that a second function of an operation of the electrical circuitry can be monitored.

5. The battery charger casing of claim 1, wherein the bottom plate further comprises a plurality of wheels disposed about a perimeter of the bottom plate so that the battery casing is elevated from a floor.

6. The epoxy material of claim 1, wherein the epoxy material further comprises intrinsic heat dissipation properties.

7. A battery charger casing comprising:
   electrical circuitry for transforming an external steady state electrical current from an independent power source to a predetermined electrical current to charge a battery;
   a power wire in electrical communication with a power plug and the electrical circuitry, wherein the power plug is in electrical communication with the independent power source;
   a battery wire in electrical communication with a quick connect plug and the electrical circuitry, wherein the quick connect plug is in electrical communication with the battery, wherein the battery is outside of the battery charger casing;
   a rigid shell in a shape of a vehicle secured to a bottom plate forming a protective void to house the electrical circuitry, wherein the independent power source is supplied from outside the shell;
   a plurality of struts interposed between the bottom plate and the electrical circuitry so that any impact force sustained by the casing is isolated to the struts;
   a headlight indicator LED, which is visible outside the shell when the electrical circuitry is in use, mounted in a simulated headlight of the shell so that a mode of operation of the battery charger circuitry can be determined; and
   an epoxy material encapsulating the electrical circuitry within the protective void.

8. The rigid shell of claim 7, wherein the rigid shell is removable from the bottom plate so that an alternative rigid shell with a different pre-selected shape can be substituted.

9. The battery charger casing of claim 7, further comprising a protective epoxy layer interposed between the bottom plate and the electrical circuitry.

10. The battery of claim 7, further comprising an auxiliary connect plug so that the battery can be quickly disconnected from the battery charger casing.

11. The battery of claim 7, wherein the battery is a 12 volt lead-acid battery.

12. The battery charger casing of claim 7, wherein the independent power source is a range between an alternating current of 90-250 volts at 50-60 hertz.

13. The battery charger casing of claim 7, wherein the electrical circuitry comprising mounted circuit board components.

14. The battery charger casing of claim 7, wherein the electrical circuitry operates at 800 mA.

15. The battery charger casing of claim 7, wherein the casing is moisture proof and submersible.

16. The battery charger casing of claim 10, further comprising a front terminal in electrical communication with the electrical circuitry and receptive to the battery wire, wherein the battery wire is removably attached to the front terminal.

17. The front terminal of claim 16, wherein the front terminal further comprising a quick connect plug.

18. The battery charger casing of claim 17, further comprising a rear terminal in electrical communication with the electrical circuitry and receptive to the power wire, wherein the power wire is removably attached to the rear terminal.

19. The rear terminal of claim 18, wherein the rear terminal further comprising a quick connect plug.

20. A battery charger casing comprising:
   electrical circuitry for transforming an external steady state AC electrical current from an independent power source to a predetermined DC electrical current to charge a battery, wherein the electronic circuitry comprising mounted circuit board components;
   a power wire in electrical communication with a power plug and the electrical circuitry, wherein the power plug is in electrical communication with the independent power source;
   a battery wire in electrical communication with a quick connect plug and the electrical circuitry, wherein the quick connect plug is in electrical communication with the battery and the battery is outside of the battery charger casing;
   a rigid shell in a shape of a vehicle and removably secured to a bottom plate forming a protective void to house the electrical circuitry, wherein the rigid shell is removable from the bottom plate so that an alternative rigid shell with a different pre-selected shape can be substitute, wherein the independent power supply is supplied from outside the shell;
   a plurality of struts contained within an interior of the rigid shell and interposed between the bottom plate and the electrical circuitry so that any impact force sustained by the casing is isolated to the struts;

an epoxy material encapsulating the electrical circuitry within the protective void, wherein the epoxy material is interposed between the bottom plate and the electrical circuitry;

a headlight indicator LED, which is visible outside the shell when the electrical circuitry is in use, mounted in a simulated headlight of the shell so that a mode of operation of the electrical circuitry can be determined;

a windshield indicator LED mounted in a simulated windshield of the shell so that a first function of an operation of the electrical circuitry can be monitored;

a taillight indicator LED mounted in a simulated taillight of the shell so that a second function of an operation of the electrical circuitry can be monitored;

an audio computer chip that produces sounds that simulate a vehicle engine;

the battery further comprising an auxiliary connect plug so that the battery can be quickly disconnected from the battery charger casing;

a front terminal in electrical communication with the electrical circuitry and receptive to the battery wire, wherein the battery wire is removably attached to the front terminal and comprising a quick connect plug; and a rear terminal in electrical communication with the electrical circuitry and receptive to the power wire, wherein the power wire is removably attached to the rear terminal and comprising a quick connect plug.

* * * * *